US011258712B2

(12) United States Patent
Nádas et al.

(10) Patent No.: US 11,258,712 B2
(45) Date of Patent: Feb. 22, 2022

(54) RESOURCE EFFICIENT FORWARDING OF GUARANTEED AND NON-GUARANTEED DATA PACKETS

(71) Applicant: Telefonaktiebolaget LM Ericsson (publ), Stockholm (SE)

(72) Inventors: Szilveszter Nádas, Budapest (HU); János Farkas, Kecskemét (HU); Balázs Varga, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 18 days.

(21) Appl. No.: 16/317,936

(22) PCT Filed: Jul. 25, 2016

(86) PCT No.: PCT/EP2016/067671
§ 371 (c)(1),
(2) Date: Jan. 15, 2019

(87) PCT Pub. No.: WO2018/019361
PCT Pub. Date: Feb. 1, 2018

(65) Prior Publication Data
US 2019/0394134 A1 Dec. 26, 2019

(51) Int. Cl.
*H04L 12/813* (2013.01)
*H04L 12/819* (2013.01)
*H04L 12/851* (2013.01)

(52) U.S. Cl.
CPC ............ *H04L 47/20* (2013.01); *H04L 47/215* (2013.01); *H04L 47/24* (2013.01)

(58) Field of Classification Search
CPC ........ H04L 47/20; H04L 47/215; H04L 47/24
See application file for complete search history.

(56) References Cited

U.S. PATENT DOCUMENTS

2011/0158184 A1* 6/2011 Agulnik ................ H04W 28/18
370/329
2013/0058214 A1* 3/2013 Foglar ................. H04L 41/0896
370/230.1

(Continued)

FOREIGN PATENT DOCUMENTS

WO 200221773 A2 3/2002

OTHER PUBLICATIONS

Specht, J. et al., "Urgency-Based Scheduler for Time-Sensitive Switched Ethernet Networks", 2016 28th Euromicro Conference on Real-Time Systems (ECRTS), Jul. 5, 2016, pp. 1-11, IEEE.

(Continued)

*Primary Examiner* — Luat Phung
(74) *Attorney, Agent, or Firm* — Coats + Bennett, PLLC (57) ABSTRACT

A node of a data network receives data packets (200). For at least one of the received data packets (200), the node determines whether the data packet (200) is a guaranteed data packet which is subject to a guarantee that the data packet is not dropped and not delayed by more than a certain delay limit or a non-guaranteed data packet which is not subject to the guarantee. Based on a worst case calculation of a delay experienced by a data packet forwarded by the node, the node configures a resource contingent with a maximum amount of resources which is more than a minimum amount of resources required to meet the guarantee. Further, the node assigns resources to the resource contingent and identifies resources in excess of the minimum amount as excess resources. In response to determining that the data packet (200) is a non-guaranteed data packet and determining that sufficient excess resources are present, the node forwards the data packet (200) based on the excess resources.

20 Claims, 9 Drawing Sheets (56) References Cited

U.S. PATENT DOCUMENTS

| | | | | |
|---|---|---|---|---|
| 2013/0094365 A1* | 4/2013 | Soffer | ................... | H04L 47/17 |
| | | | | 370/236 |
| 2013/0301408 A1* | 11/2013 | Boden | ................... | H04L 47/24 |
| | | | | 370/230 |
| 2015/0016266 A1* | 1/2015 | Dumitrescu | .......... | H04L 47/215 |
| | | | | 370/236 |
| 2015/0250001 A1* | 9/2015 | Tan | ................. | H04N 21/23106 |
| | | | | 370/329 |
| 2015/0334732 A1* | 11/2015 | Caretti | ............... | H04L 47/2433 |
| | | | | 370/329 |
| 2016/0044695 A1* | 2/2016 | Gunner | .................. | H04L 49/90 |
| | | | | 370/336 |

OTHER PUBLICATIONS

Nadas, S. et al., "Per Packet Value: A Practical Concept for Network Resource Sharing", 2016 IEEE Global Communications Conference (GLOBECOM), Dec. 4, 2016, pp. 1-7, IEEE.

IEEE Computer Society, "IEEE Standard for Local and metropolitan area networks—Virtual Bridged Local Area Networks Amendment 12: Forwarding and using Enhancements for Time-Sensitive Streams", IEEE Std 801.1Qav-2009, Jan. 5, 2010, pp. 1-79, IEEE.

Alderisi, G. et al., "Introducing Support for Scheduled Traffic over IEEE Audio Video Bridging Networks", 2013 IEEE 18th Conference on Emerging Technologies & Factory Automation (ETFA), Sep. 10, 2013, pp. 1-9, IEEE.

Ko, J. et al., "Research on Optimal Bandwidth Allocation for the Scheduled Traffic in IEEE 802.1 AVB", Proceedings of the 2015 IEEE International Conference on Vehicular Electronics and Safety, Yokohama, Japan, Nov. 5, 2015, pp. 31-35, IEEE.

\* cited by examiner

RESOURCE EFFICIENT FORWARDING OF GUARANTEED AND NON-GUARANTEED DATA PACKETS

TECHNICAL FIELD

The present invention relates to methods for handling data traffic in a data network and to corresponding devices.

BACKGROUND

In communication networks, e.g., based on the Internet Protocol (IP) and the Transmission Control Protocol (TCP), various kinds of data traffic are transferred. Such different kinds data traffic may differ with respect to their sensitivity concerning delay which occurs while data packets of the data traffic are forwarded through the communication network, e.g., in terms of a per-hop delay or an end-to-end delay. For example, for data packets of a file download the delay of the data packets is typically not very relevant. However, in the case of realtime data transfers, such as multimedia streaming, excessive delay of a data packet may adversely impact the user experience because typically data packets need to be available at the receiver at a certain time, and later received data packets are useless. Further, certain types of traffic may also be loss-sensitive, so that it may be desirable to control the forwarding of the data packets in such a way that dropping of data packets in avoided as far as possible.

In this respect, it is known to accomplish forwarding of delay sensitive traffic using a scheduling mechanism which provides guarantees with respect to packet losses and delays, as for example suggested in "Urgency-Based Scheduler for Time-Sensitive Switched Ethernet Networks" by J. Specht and Soheil Samii, 28th Euromicro Conference on Real-Time Systems (ECRTS), Toulouse, France, Jul. 5-8, 2016. However, in this case there is no way of at the same time efficiently handling traffic which is not subject to such guarantees.

Accordingly, there is a need for techniques which allow for efficiently forwarding data traffic of which one part is subject to a guarantee with respect to delay and packet loss while another part is not subject to such guarantee.

SUMMARY

According to an embodiment of the invention, a method of handling data traffic in a data network is provided. According to the method, a node of the data network receives data packets. For at least one of the received data packets, the node determines whether the data packet is a guaranteed data packet which is subject to a guarantee that the data packet is not dropped and not delayed by more than a certain delay limit or a non-guaranteed data packet which is not subject to the guarantee. Based on a worst case calculation of a delay experienced by a data packet forwarded by the node, the node configures a resource contingent with a maximum amount of resources which is more than a minimum amount of resources required to meet the guarantee. Further, the node assigns resources to the resource contingent and identifies resources in excess of the minimum amount as excess resources. In response to determining that the data packet is a non-guaranteed data packet and determining that sufficient excess resources are present, the node forwards the data packet based on the excess resources.

According to a further embodiment of the invention, a node for a data network is provided. The node is configured to receive data packets. Further, the node is configured to determine, for at least one of the received data packets, whether the data packet is a guaranteed data packet which is subject to a guarantee that the data packet is not dropped and not delayed by more than a certain delay limit or a non-guaranteed data packet which is not subject to the guarantee. Further, the node is configured to, based on a worst case calculation of a delay experienced by a data packet forwarded by the node, configure a resource contingent with a maximum amount of resources which is more than a minimum amount of resources required to meet the guarantee. Further, the node is configured to assign resources to the resource contingent and identify resources in excess of the minimum amount as excess resources. Further, the node is configured to, in response to determining that the data packet is a non-guaranteed data packet and determining that sufficient excess resources are present, forward the data packet based on the excess resources.

According to a further embodiment of the invention, a computer program or computer program product is provided, e.g., in the form of a non-transitory storage medium, which comprises program code to be executed by at least one processor of an node for a data network. Execution of the program code causes the node to receive data packets. Further, execution of the program code causes the node to determine, for at least one of the received data packets, whether the data packet is a guaranteed data packet which is subject to a guarantee that the data packet is not dropped and not delayed by more than a certain delay limit or a non-guaranteed data packet which is not subject to the guarantee. Further, execution of the program code causes the node to, based on a worst case calculation of a delay experienced by a data packet forwarded by the node, configure a resource contingent with a maximum amount of resources which is more than a minimum amount of resources required to meet the guarantee. Further, execution of the program code causes the node to assign resources to the resource contingent and identify resources in excess of the minimum amount as excess resources. Further, execution of the program code causes the node to, in response to determining that the data packet is a non-guaranteed data packet and determining that sufficient excess resources are present, forward the data packet based on the excess resources.

Details of such embodiments and further embodiments will be apparent from the following detailed description of embodiments.

DETAILED DESCRIPTION OF EMBODIMENTS

In the following, concepts according to embodiments of the invention will be explained in more detail by referring to the accompanying drawings. The illustrated concepts relate to handling data traffic in a data network. Specifically, the concepts relate to controlling forwarding of data packets of the data traffic by a node of such data network. The data network may for example be part of a communication network. One example of such communication network is a wireless communication network, e.g., based on GSM (Global System for Mobile Communication), UMTS (Universal Mobile Telecommunications System), or LTE (Long Term Evolution) technologies specified by 3GPP ($3^{rd}$ Generation Partnership Project). For example, the data network implement be a transport network part of such wireless communication network. However, the concepts could also be applied in other types of communication systems or data networks. The data packets may be IP data packets, optionally in connection with further protocols, e.g., an Ethernet framing protocol, TCP, UDP (User Datagram Protocol), or a tunneling protocol such as GTP (General Packet Radio Service Tunneling Protocol).

Figure 1:
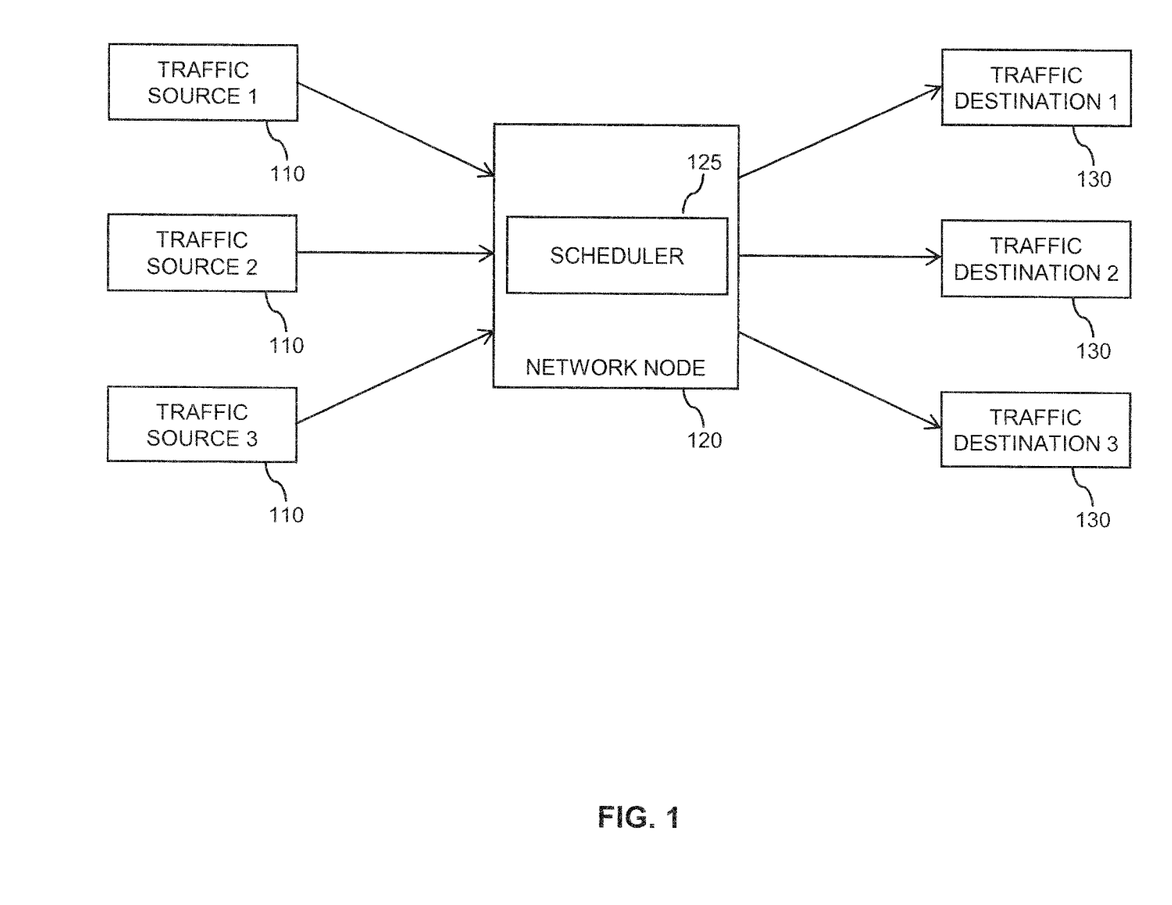
FIG. 1 schematically illustrates a scenario in which data traffic is handled according to an embodiment of the invention.

In the concepts as illustrated in the following, a network node, e.g., a switch or a gateway, forwards data traffic. An example of a corresponding scenarios is illustrated in FIG. 1, where data traffic provided by multiple traffic sources 110 is forwarded by a network node 120 to multiple traffic destinations 130. Each pair of a certain traffic source 110 and a certain traffic destination may define a flow. For example, in the case of data traffic based on IP data packets, the packets of the same flow may carry the same source address and the same destination address. The data traffic is assumed to include guaranteed data packets and non-guaranteed data packets. The guaranteed data packets are subject to a guarantee that the data packet forwarded by the node is not delayed by more than a certain delay limit and not dropped. For the non-guaranteed data packets this guarantee does not apply, i.e., the non-guaranteed data packets may be dropped. However, the non-guaranteed data packets may nonetheless benefit from the delay limit as defined for the guaranteed data packets. That is to say, if a non-guaranteed data packet is not dropped, can be transmitted within the same delay limit as guaranteed for the guaranteed data packets.

The forwarding of the data traffic by the network node 120 is managed by a scheduler 125. The scheduler 125 operates on the basis of a scheduling algorithm which enables to meet the guarantee for the guaranteed data packets. For this purpose, the scheduling algorithm reserves one or more resource contingents which are filled with sufficient resources to meet the guarantee. By way of example, the resource contingent(s) may be managed on the basis of one or more token buckets and filling rate of the token bucket(s) and size of the token bucket(s) be set in such a way that the guarantee is met. This is accomplished on the basis of a worst case calculation for the delay experienced by a data packet forwarded by the node 120.

The worst case calculation may be based on known, estimated, or measured characteristics of the data traffic forwarded by the node, e.g., data rates, maximum size, or burstiness of the data traffic. By way of example, in the case of higher burstiness and/or higher data rate of a certain flow, a larger resource contingent may be needed to meet the guarantee. On the other hand, the maximum size of the resource contingent should be limited because the worst case delay is found to be minimal when the maximum size of the resource contingent is equal to the minimum amount of resources required to meet the guarantee and increases with the maximum size of the resource contingent. This can be attributed to an overall limitation of the available resources. For example, if the amount of reserved resources increases, this means that transmission of more data packets over the same bottleneck (e.g., an interface with limited capacity) is admitted, which typically results in increased worst case delay for transmission of data packets over this bottleneck.

The worst case delay calculation may be based on various models or calculation methods. An example of how the worst case delay can be calculated in a scenario in which multiple token buckets are used for providing a delay guarantee for multiple flows is given in "Urgency-Based Scheduler for Time-Sensitive Switched Ethernet Networks" by J. Specht and Soheil Samii, 28th Euromicro Conference on Real-Time Systems (ECRTS), Toulouse, France, Jul. 5-8, 2016.

In the illustrated concepts, the maximum size of the resource contingent(s) is intentionally set to be larger than a minimum size needed to meet the guarantee. This increased size of the resource contingent(s) is considered in the worst-case delay calculation. In this way, the resource contingent may include resources in excess of the minimum amount required to meet the guarantee, in the following referred to as excess resources. The scheduler 125 may then use the excess resources for forwarding non-guaranteed data packets. In particular, if sufficient excess resources are present, the scheduler 125 may use these excess resources for forwarding one or more non-guaranteed data packet. If no sufficient excess resources are present, the scheduler 125 may decide to drop the non-guaranteed data packet. Accordingly, resources not used for forwarding the guaranteed data packets can be efficiently used for forwarding the non-guaranteed data packets.

It is noted that the elements of FIG. 1 are merely illustrative and that the data network may include additional nodes and that various connection topologies are possible in such data communication network. For example, such additional nodes could be intermediate nodes between the traffic sources 110 and the network node 120 or intermediate nodes between the network node 120 and the traffic destinations 130. Such intermediate nodes could forward the data traffic in a similar manner as explained for the network node 120.

The distinction between the guaranteed data packets and the non-guaranteed data packets may be based on a marking of the data packets with a value, in the following referred to as packet value. An example of how this may be accomplished is illustrated in FIG. 2.

Figure 2:
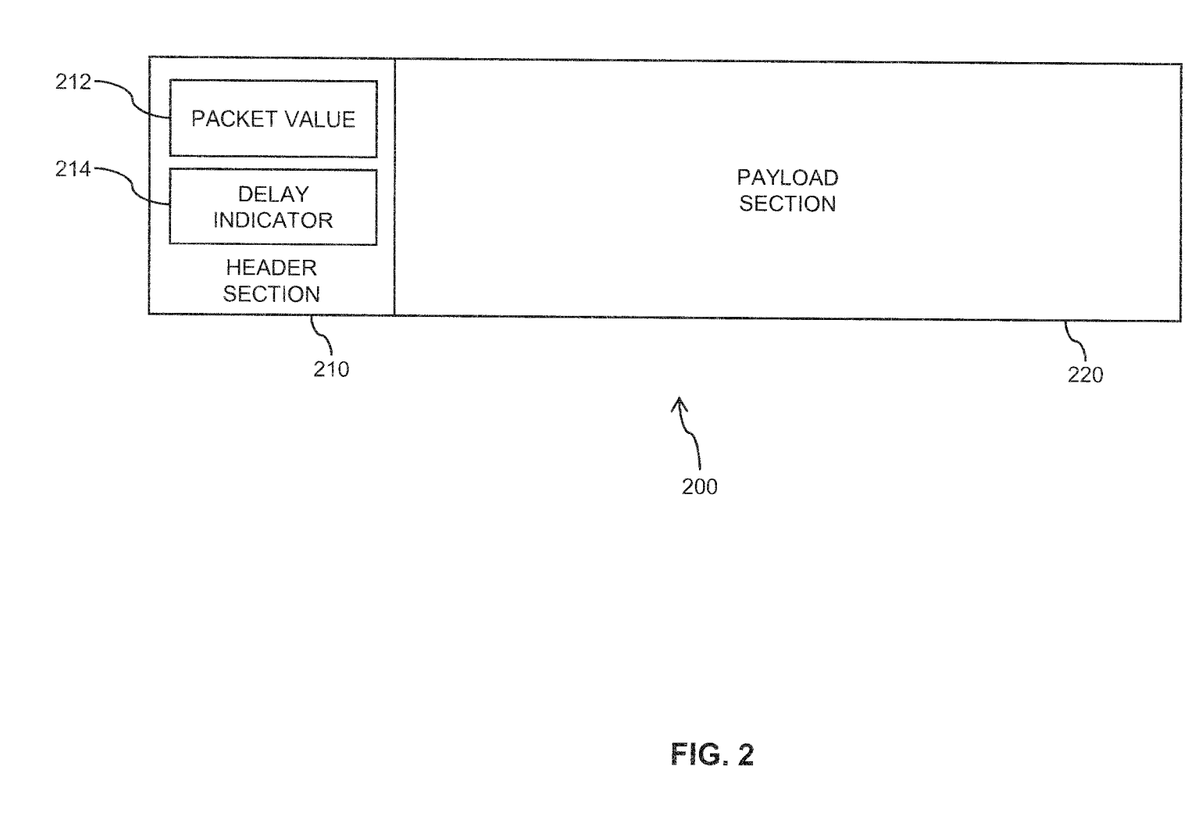
FIG. 2 schematically an example of a data packet as utilized in an embodiment of the invention.

FIG. 2 shows an exemplary data packet 200. The data packet may be an IP data packet. Further, the data packet 200 may be based on various kinds of additional protocols, e.g., a transport protocol such as TCP or UDP, or a tunnelling protocol such as GTP. As illustrated, the data packet 200 includes a header section 210 and a payload section 220. The payload section 220 may for example include user data. If a tunnelling protocol is utilized, the payload section 220 may also include one or more encapsulated data packets. The header section 210 typically includes various kinds of information which is needed for propagation of the data packet 200 through the data communication system. For example, such information may include a destination address and/or source address.

As further illustrated, the header section 210 includes a label 212 indicating the packet value. The label 212 may include a scalar value, e.g., in the range of 0 to 255, to indicate the packet value. The label 214 may for example be included in a corresponding information fields in the header section 210. For this purpose, a corresponding information field may be defined for the above-mentioned protocols or one or more existing information fields may be reused. As further illustrated, the header section may also include a delay indicator 214. The delay indicator may for example be used for determining a delay class of the data packet. Different delay limits may be defined depending on the delay indicator.

The packet value may represent a level of importance of the data packet, e.g., in terms of a network-level gain when the data packet is delivered. Accordingly, nodes of the data network, including the network node 120, should aim at utilizing their available resources to maximize the total packet value of the successfully transmitted data packets. The packet value may be considered in relation to the number of bits in the data packet, i.e., the value included in the label 212 may be treated as a value per bit, which enables direct comparison of data packets of different sizes. Accordingly, for the same marking in the label 212, a data larger packet may would have a higher packet value than a smaller data packet. On the other hand, transmission of the larger data packet requires more resources than transmission of the shorter data packet. The packet value may be set by an operator of the data network according to various criteria, e.g., by assigning a higher packet value to data traffic of premium users or emergency traffic. Accordingly, the packet value may be used to express the importance of data packets relative to each other, which in turn may be utilized by the node 120 (or other nodes of the data network) to how to utilize their available resources for forwarding the data packets, e.g., by using resources for forwarding a data packet with high packet value at the expense of a data packet with low packet value, which may then be delayed or even dropped.

For utilizing the packet value for distinguishing between guaranteed data packets and non-guaranteed data packets, a threshold may be defined. Based on a comparison of the packet value to the threshold, the network node 120 can decide whether the data packet is a guaranteed data packet or a non-guaranteed data packet. In particular, if for a given data packet the packet value exceeds the threshold the network node 120 may treat the data packet as a guaranteed data packet. Otherwise, the network node 120 may treat the data packet as a non-guaranteed data packet.

The delay indicator 214 may for example indicate a maximum delay the data packet may experience when being forwarded, e.g., in terms of a per-hop delay or in terms of an end-to-end delay. This information may then be applied by the network node 120 for setting the above-mentioned delay limit of the guarantee.

The scheduler 125 may thus operate by providing the guarantee with respect to loss and delay and using the packet value for deciding whether a certain data packet is to be treated as a guaranteed data packet or as a non-guaranteed data packet. The guaranteed data packets, e.g., the data packets for which the packet value is above the threshold, may then be subjected to traffic shaping. The non-guaranteed packets may be filtered, either before being stored in a queue or when being output from the queue.

Figure 3:
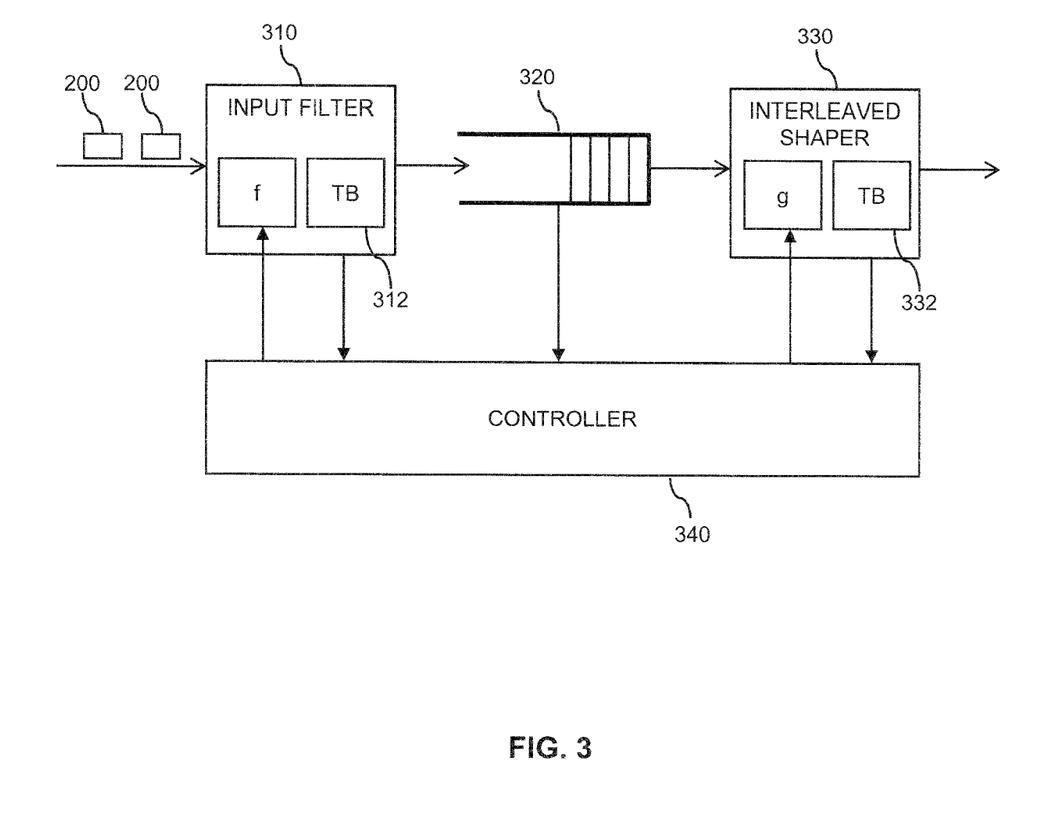
FIG. 3 schematically illustrates an architecture of a scheduler according to an embodiment of the invention.

FIG. 3 schematically illustrates an exemplary architecture which may be used for implementing forwarding of data packets according to the concepts as illustrated herein. For example, the architecture of FIG. 3 may be used to implement the above-mentioned scheduler 125.

As illustrated, the architecture of FIG. 3 includes an input filter 310 in which the data packets 200 received by the network node 120 subjected to input filtering 200. Further, the architecture includes a queue 320 for temporarily storing the data packets 200 passed through the input filter 31, and an interleaved shaper 330 for controlling forwarding of the data packets 200 from the queue 320. Further, the architecture provides a controller 340 which may be used for tuning operation of the input filter 310 and/or of the interleaved shaper 330. For example, the controller may collect statistics from the input filter 310, e.g., an average drop rate, from the queue 320, e.g., a queue length and/or an average queueing time, and/or from the interleaved shaper 330, e.g., an average drop rate or an average delay, and tune the operation of the input filter 310 and/or of the interleaved shaper 330 depending on the collected statistics.

The input filtering by the input filter 310 involves determining for each of the data packets 200 whether the data packet 200 is a guaranteed data packet or a non-guaranteed data packet. The input filter 310 passes the guaranteed data packets to a queue 320. In the case of the non-guaranteed data packets, the input filter 310 can decide between dropping the non-guaranteed data packet 200 or passing the non-guaranteed data packet 200 to the queue 320. This may be accomplished depending on the packet value, in the following denoted as V. Further, the input filter 310 may also decide depending on a resource contingent managed on the basis of a set 312 of one or more token buckets (TB) whether to drop the non-guaranteed data packet 200. This may also consider the size of the non-guaranteed data packet 200. For example, if there are sufficient resources for further processing a non-guaranteed data packet 200 with size L, i.e., if there are sufficient tokens in a token bucket for the size L, the input filter 310 may pass the non-guaranteed data packet 200 to the queue 320. A function $g(V, L)$ may be applied for determining the number of tokens required to let the non-guaranteed data packet 200 pass. Here, the number of required tokens will typically increase with increasing size L of the packet, but decrease with increasing packet value V. Accordingly, non-guaranteed data packets 200 with higher packet value have a higher likelihood of being passed to the queue 320. The controller 340 may tune parameters of the function $g(V, L)$ depending on the statistics provided by the input filter 310, the queue 320, and/or the interleaved shaper 330.

The interleaved shaper 330 controls forwarding of the data packets 200 from the queue 320. This involves taking the first data packet 200 from the queue 320 and again determining for whether the data packet 200 is a guaranteed data packet or a non-guaranteed data packet. If the data packet 200 is a guaranteed data packet, it is forwarded by the interleaved shaper 330, without delaying it in excess of the delay limit. If the data packet 200 is a non-guaranteed data packet, the interleaved shaper 330 may decide between dropping the non-guaranteed data packet 200 or forwarding the non-guaranteed data packet 200.

The interleaved shaper 330 may utilize a resource contingent managed on the basis of a set 332 of one or more token buckets (TB) whether to drop a non-guaranteed data packet 200 and when to forward a guaranteed data packet 200. This may also consider the size of the data packet 200. The interleaved shaper 330 forwards a guaranteed data packet 200 when there are sufficient tokens in a corresponding token bucket. The interleaved shaper 330 forwards a non-guaranteed data packet 200 only if there are sufficient excess resources. This may be the case if a token bucket is filled beyond a minimum amount of tokens which is required to meet the delay guarantee. For example, if there are sufficient excess resources for forwarding a non-guaranteed data packet 200 with size L, i.e., if there are sufficient excess tokens in a token bucket for the size L, the interleaved shaper 330 may forward the non-guaranteed data packet 200, using the excess tokens. A function f(V, L) may be applied for determining the number of tokens required for forwarding a guaranteed or non-guaranteed data packet 200. Here, the number of required tokens will typically increase with increasing size L of the packet, but decrease with increasing packet value V. Accordingly, non-guaranteed data packets 200 with higher packet value have a higher likelihood of being forwarded by the interleaved shaper 330. The controller 340 may tune parameters of the function f(V, L) depending on the statistics provided by the input filter 310, the queue 320, and/or the interleaved shaper 330.

Figure 4:
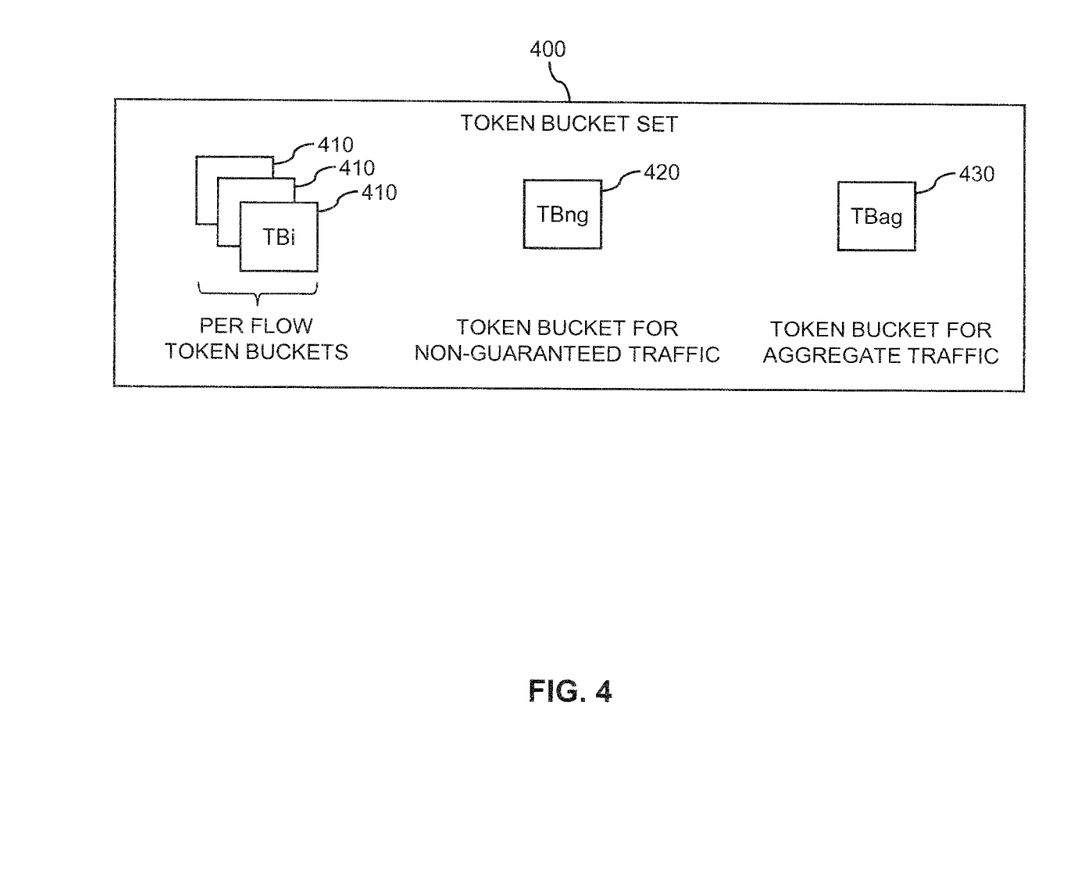
FIG. 4 schematically illustrates a set of token buckets as utilized according to an embodiment of the invention.

FIG. 4 shows an example of a set 400 of token buckets 410, 420, 430 which could be used in the input filter 310 and/or in the interleaved shaper. As illustrated, the set 400 includes per flow buckets 410, denoted as TBi, where i is an index of the corresponding flow. The per flow token buckets 410 include one token bucket 410 per flow of the data traffic forwarded by the network node 120. Further, the set includes a token bucket 420 for non-guaranteed traffic, denoted as TBng. The token bucket 420 for non-guaranteed traffic may be used for managing resources which are dedicated to be used for forwarding the non-guaranteed data packets 200. For example, the token bucket 420 could be filled at a rate which corresponds to an estimated or desirable proportion of non-guaranteed data traffic to be served by the network node 120. As further detailed below, the token bucket 420 could also be used as an overflow for the per-flow token buckets 410. In this case, excess tokens which do not fit into the per-flow token buckets 410 could be collected in the token bucket 420 and the token bucket 420 thus be utilized for managing the excess resources to be used for forwarding the non-guaranteed data traffic. As further illustrated, the set 400 includes an aggregate token bucket 430, denoted as TBag. The token bucket 430 may for example be used for managing an overall resource contingent, which can for example be used as a basis for deciding whether the input filter 310 should drop a non-guaranteed data packet 200.

As mentioned above, the forwarding of the non-guaranteed data packets 200 is based on the availability of sufficient excess resources, i.e., resources in excess of the minimum amount of resources to meet the guarantee for the guaranteed data packets 200. For this purpose, an extra space is added to the reserved resource contingent(s). In other words, the maximum size of the reserved resource contingent(s) is set to be larger than actually required to meet the guarantee. The increased size of the reserved resource contingent(s) is considered in the worst case calculation of the delay, thereby making sure that also with the increased size of the reserved resource contingent(s) the guarantee is still met.

Figure 5:
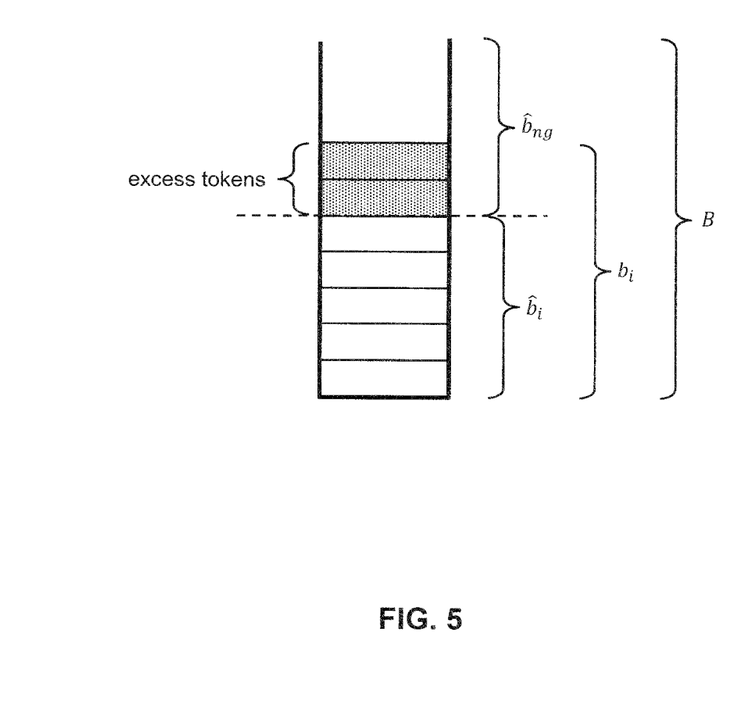
FIG. 5 shows an example of configuring a token bucket according to an embodiment of the invention.

According to one option, the extra space of the resource contingent(s) can be provided by adding an extra space to one or more of the per-flow token buckets 410. This is illustrated by FIG. 5, which shows a configuration of an exemplary token bucket. As illustrated, the token bucket has a size B. The size B is larger than a minimum size $\hat{b}_i$ required to meet the guarantee. In particular, the size B corresponds to the minimum size $\hat{b}_i$ plus an extra space denoted by $\overline{b}_{ng}$.

The minimum size $\hat{b}_i$ may for example depend on the expected burstiness and/or expected maximum size of the data packets 200. Due to the increased size, the token bucket can hold excess tokens, i.e., be filled to a level $b_i$ in excess of the minimum size $\hat{b}_i$.

According to a further option, the size of one or more of the per-flow token buckets 410 may be set to the minimum size $\hat{b}_i$ required to meet the guarantee, and if these per-flow token buckets 410 are full, the overflowing tokens may be added to another token bucket, e.g., to the token bucket 420. The token bucket 420 could otherwise be configured with a fill rate of zero, i.e., only be filled with the overflowing token buckets. The token bucket 420 could thus be exclusively used for collecting excess tokens (from one or more other token buckets).

The decision whether a non-guaranteed data packet 200 can be forwarded on the basis of the available excess resources may be based on the amount of excess token buckets.

For example, when collecting the excess tokens in the extra space of the per-flow token buckets 410, the interleaved shaper 330 may decide to drop a non-guaranteed data packet 200 of size L unless the amount of excess tokens in one of the per-flow token buckets 410 exceeds the value f(V,L) for this data packet 200. If the amount of excess tokens in one of the per-flow token buckets 410 exceeds the value f(V,L), the interleaved shaper 330 may decide to forward the non-guaranteed data packet 200 using the excess tokens, i.e., taking an amount of tokens from the per-flow token bucket 410 which is given by f(V,L).

When collecting the excess tokens in a dedicated token bucket, e.g., in the token bucket 420, the interleaved shaper 330 may decide to drop a non-guaranteed data packet 200 of size L unless the amount of excess tokens in this token bucket exceeds the value f(V,L) for this data packet 200. If the amount of excess tokens in one of the per-flow token buckets 410 exceeds the value f(V,L), the interleaved shaper 330 may decide to forward the non-guaranteed data packet 200 using the excess tokens, i.e., taking an amount of tokens from the per-flow token bucket 410 which is given by f(V,L).

Figure 6:
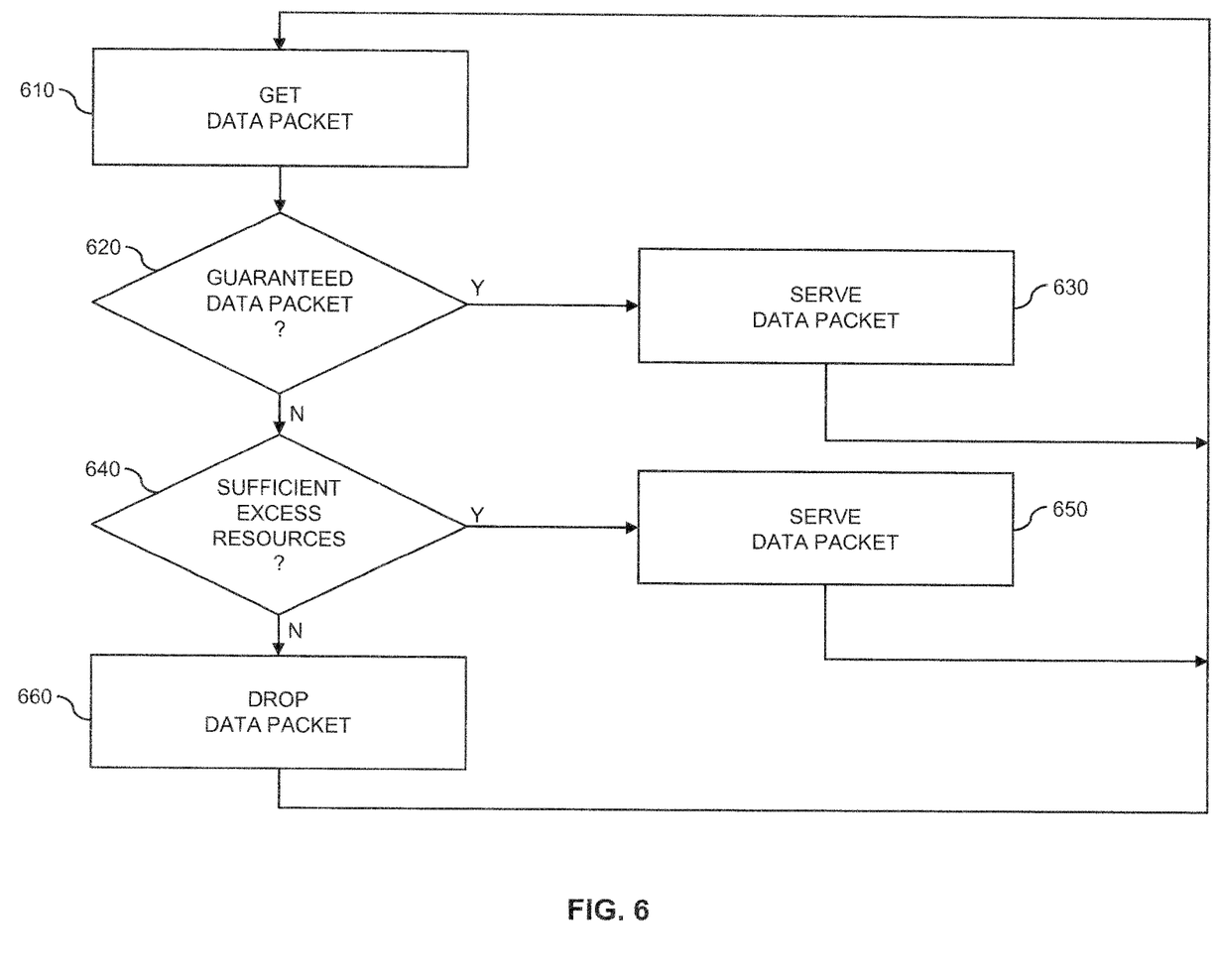
FIG. 6 shows a flowchart for schematically illustrating a method of controlling forwarding of data packets according to an embodiment of the invention.

FIG. 6 shows a flowchart for illustrating a method of controlling forwarding of data packets in a data network. The method of FIG. 6 may be utilized for implementing the illustrated concepts in a node of the data network, such as the above-mentioned network node 120. For example, the method could be implemented by a scheduler of the node, such as the above-mentioned scheduler 125. If a processor-based implementation of the node is used, the steps of the method may be performed by one or more processors of the node. In such a case the node may further comprise a memory in which program code for implementing the below described functionalities is stored.

In the method of FIG. 6, it is assumed that data packets received by the node can each be a guaranteed data packet which is subject to a guarantee that the data packet is not dropped and not delayed by more than a certain delay limit or a non-guaranteed data packet which is not subject to the guarantee. Further, it is assumed that the forwarding of the data packets is based on one or more resource contingents configured with a maximum amount of resources which is more than a minimum amount of resources required to meet the guarantee. The maximum size is configured on the basis of a worst case calculation of a delay experienced by a data packet forwarded by the node. The node assigns resources to the resource contingent and identifies resources in excess of the minimum amount as excess resources. The maximums size of the resource contingent is configured based on a worst case calculation of a delay experienced by a data packet forwarded by the node.

The resource contingent may be managed on the basis of a token bucket, e.g., one of the above-mentioned token buckets 410, 420, 430. The node may then assign resources to the resource contingent by adding tokens to the token bucket. A size of the token bucket may then correspond to the maximum amount of resources of the resource contingent, e.g., as illustrated in the example of FIG. 5.

The token bucket may also be configured with a size corresponding to the minimum amount of resources required to meet the guarantee. In this case, a further token bucket may be configured for the excess resources and the node may add tokens to the further token bucket only if the token bucket is full. In other words, the further token bucket may be used for receiving overflowing tokens from the token bucket.

In some scenarios, the received data packets may be part of multiple flows. In this case a corresponding resource contingent with a maximum amount of resources which is more than a minimum amount of resources required to meet the guarantee may be configured for each of the flows. The node may then assign resources to the corresponding resource contingent and identifies resources in excess of the minimum amount (in any of the different contingents) as excess resources.

If the received data packets are part of multiple flows the corresponding resource contingent for each of the flows may be managed on the basis of a corresponding token bucket, such as one of the above-mentioned per flow buckets 410. For each of the flows the node may then assign resources to the corresponding resource contingent by adding tokens to the corresponding token bucket. For each of the flows a size of the corresponding token bucket may corresponds to the maximum amount of resources of the corresponding resource contingent, e.g., as illustrated in the example of FIG. 5.

In some scenarios, the corresponding token bucket for each of the flows may also be configured with a size corresponding to the minimum amount of resources required to meet the guarantee. In this case, a further token bucket may be configured for the excess resources and the node may add tokens to the further token bucket only if one of the corresponding token buckets of the resource contingents for the flows is full. Accordingly, the further token bucket may be used for receiving overflowing tokens from the other token buckets. For example, the above-mentioned token bucket 420 could be used for receiving overflowing token buckets from the above-mentioned per flow token buckets 410.

At step 610, the node may get a data packet which was received by the node. For example, node may get the data packet, e.g., one of the above-mentioned data packets 200, from an interface with respect to another node of the data network or from a queue in which the data packet is temporarily stored.

At step 620, the node determines whether the data packet is a guaranteed data packet which is subject to a guarantee that the data packet is not dropped and not delayed by more than a certain delay limit or a non-guaranteed data packet which is not subject to the guarantee. In the example of FIG. 6, the node determines whether the data packet is a guaranteed data packet, as indicated by branch "Y". If this is not the case, the node determines that the data packet is a non-guaranteed data packet, as indicated by branch "N".

In some scenarios, each of the data packets received by the node is marked with a value, e.g., the above-mentioned packet value. The node may then determine depending on the value whether the data packet is a guaranteed data packet or a non-guaranteed data packet, e.g., by comparing the value to a threshold. For example, if the value is above the threshold the node may determine that the data packet is a guaranteed data packet.

The determination of step 620 may also depend on a size of the data packet. For example, the value marking the packet may be treated as a value per bit of the data packet, i.e., the value could be proportional to the size of the data packet.

If the data packet is found to be a guaranteed data packet, the node may proceed to step 630 and serve the guaranteed data packet. This may involve forwarding the guaranteed data packet based on the resources from the resource contingent. In some cases, the node may wait with the forwarding until sufficient resources are available in the resource contingent. If there are multiple flows with corresponding resource contingents, the node may forward the data packet based on based on the resources in the resource contingent corresponding to the flow the data packet is part of. From step 630, the node may return to step 610 to proceed with getting a next data packet.

If the data packet is found to be a non-guaranteed data packet, the node may proceed to step 640 and check if sufficient excess resources are available for forwarding the non-guaranteed data packet.

In some scenarios, each of the data packets received by the node is marked with a value, e.g., the above-mentioned packet value. The node may then determine depending on the value whether the sufficient excess resources are present. For example, the above-mentioned function g(V,L) or f(V,L) may be applied to check whether sufficient excess tokens are available.

If sufficient excess tokens are found to be available at step 640, as indicated by branch "Y", the node may proceed to step 650 and serve the non-guaranteed data packet by forwarding the non-guaranteed data packet based on the excess resources. Since in this case the non-guaranteed data packet can be forwarded without significant further delay, it is forwarded within the same delay limit as defined for the guaranteed data packet. Accordingly, even though the data packet is non-guaranteed, it may benefit from the guaranteed delay limit. From step 650, the node may return to step 610 to proceed with getting a next data packet.

If no sufficient excess tokens are found to be available at step 640, as indicated by branch "N", the node may proceed to step 660 and drop the non-guaranteed data packet. From step 660, the node may return to step 610 to proceed with getting a next data packet.

In some scenarios, each of the data packets received by the node is marked with a value, e.g., the above-mentioned packet value. In response to determining that the data packet is a non-guaranteed data packet, the node may then also decide depending on the value whether to drop the data packet. For example, this decision could be part of input filtering of the received data packets, before storing the data packets in a queue, such as the queue 320.

Figure 7:
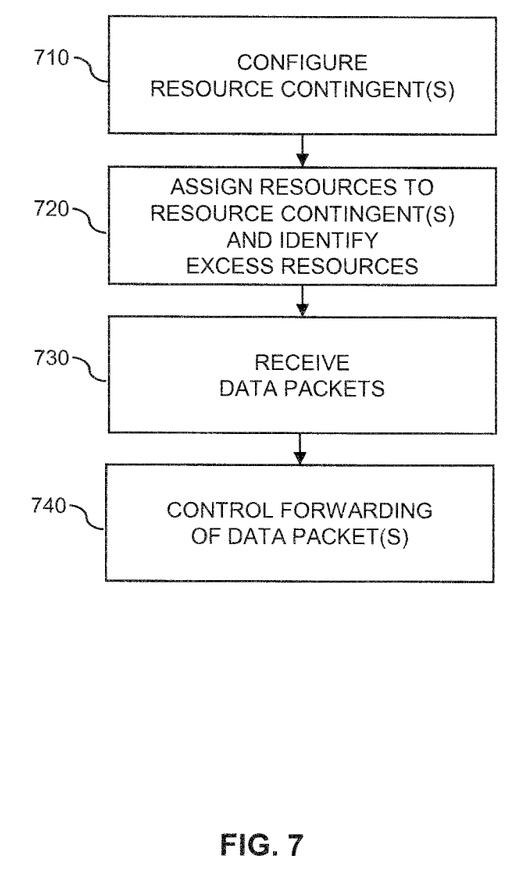
FIG. 7 shows a method of handling data traffic according to an embodiment of the invention.

FIG. 7 shows a flowchart for illustrating a method of handling data traffic in a data network. The method of FIG. 7 may be utilized for implementing the illustrated concepts in a node of the data network, such as the above-mentioned network node 120. If a processor-based implementation of the node is used, the steps of the method may be performed by one or more processors of the node. In such a case the node may further comprise a memory in which program code for implementing the below described functionalities is stored.

In the method of FIG. 7, it is assumed that data packets received by the node can each be a guaranteed data packet which is subject to a guarantee that the data packet is not dropped and not delayed by more than a certain delay limit or a non-guaranteed data packet which is not subject to the guarantee.

At step 710, the node configures a resource contingent with a maximum amount of resources which is more than a minimum amount of resources required to meet the guarantee. This is accomplished on the basis of a worst case calculation of a delay experienced by a data packet forwarded by the node.

The node may manage the resource contingent on the basis of one or more token buckets, e.g., one of the above-mentioned token buckets 410, 420, 430. A size of the token bucket used for managing the resource contingent may then correspond to the maximum amount of resources of the resource contingent, e.g., as illustrated in the example of FIG. 5.

In some scenarios, the node may configure the token bucket with a size corresponding to the minimum amount of resources required to meet the guarantee. In this case, a further token bucket may be configured for the excess resources and the node may add tokens to the further token bucket only if the token bucket is full. In other words, the further token bucket may be used for receiving overflowing tokens from the token bucket.

In some scenarios, the received data packets may be part of multiple flows. In this case a the node may configure a corresponding resource contingent for each of the flows with a maximum amount of resources which is more than a minimum amount of resources required to meet the guarantee. In this case, the node may configure the maximum size of each resource contingent on the basis of a worst case calculation of a delay experienced by a data packet forwarded by the node.

If the received data packets are part of multiple flows the node may manage the corresponding resource contingent for each of the flows on the basis of a corresponding token bucket, such as one of the above-mentioned per flow buckets 410. For each of the flows a size of the corresponding token bucket may corresponds to the maximum amount of resources of the corresponding resource contingent, e.g., as illustrated in the example of FIG. 5.

In some scenarios, the node may configure the corresponding token bucket for each of the flows with a size corresponding to the minimum amount of resources required to meet the guarantee. In this case, the node may configure a further token bucket for the excess resources, such as the above-mentioned token bucket 420.

The node may then assign resources to the resource contingent by adding tokens to the token bucket. A size of the token bucket may then correspond to the maximum amount of resources of the resource contingent, e.g., as illustrated in the example of FIG. 5.

At step 720, the node assigns resources to the resource contingent(s) configured at step 710. Further, the node identifies resources in excess of the minimum amount required to meet the guarantee as excess resources. If the resource contingent is managed on the basis of a token bucket, the node may assign the resources to the resource contingent by adding tokens to the token bucket. In scenarios with multiple resource contingents for multiple flows, the node may, for each of the flows, assign resources to the corresponding resource contingent by adding tokens to the corresponding token bucket.

If a further token bucket is configured for the excess resources, the node may add tokens to the further token bucket only if the token bucket used for managing the resource contingent is full. In the case of multiple resource contingents corresponding to multiple flows, the node may add tokens to the further token bucket only if the token bucket used for managing the resource contingent one of the corresponding token buckets of the resource contingents for the flows is full. Accordingly, the further token bucket may be used for receiving overflowing tokens from the other token buckets. For example, the above-mentioned token bucket 420 could be used for receiving overflowing token buckets from the above-mentioned per flow token buckets 410.

At step 730, the node receives data packets of the data traffic. As mentioned above, the data packets may be part of multiple flows. The node may receive the data packets from one or more other nodes of the data network.

In some scenarios, the node may decide whether to store a data packet received at step 730 in a queue maintained by the node for temporarily storing the received data packets, such as the queue 320. This decision may be accomplished by an input filter, such as the above-mentioned input filter 310. For example, the node may determine that at least one of the received data packets is a non-guaranteed data packet, and then decide between the storing the non-guaranteed data packet in the queue and dropping the non-guaranteed data packet.

In some scenarios, each of the data packets received by the node is marked with a value, e.g., the above-mentioned packet value. In response to determining that the data packet is a non-guaranteed data packet, the node may then also decide depending on the value whether to drop the data packet. For example, only packets marked with a value above a threshold could be passed to the queue.

At step 740, the node controls forwarding of the received data packets based on the configured resource contingent(s). If the node maintains a queue for temporarily storing the received data packets, the node may control forwarding of the data packets from the queue. The forwarding is controlled according to the method of FIG. 6.

Figure 8:
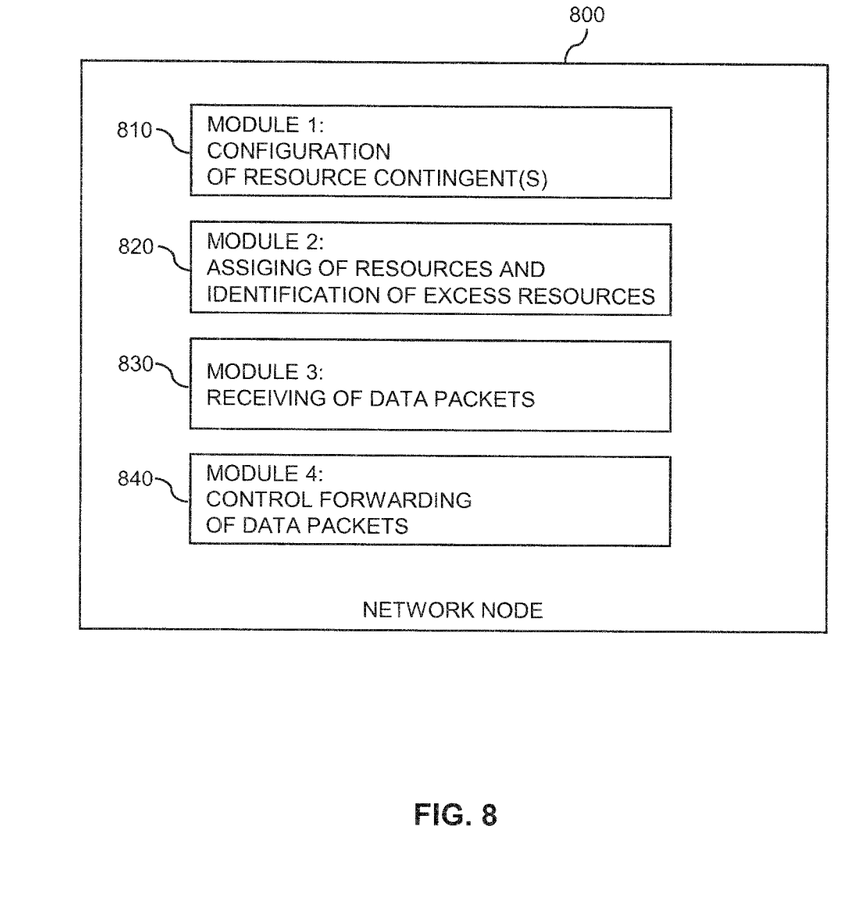
FIG. 8 shows a block diagram for illustrating functionalities of a network node according to an embodiment of the invention.

FIG. 8 shows a block diagram for illustrating functionalities of a network node 800 which operates according to the method of FIG. 7. As illustrated, the network node 800 may be provided with a module 810 configured to configure one or more resource contingent(s), such as explained in connection with step 710. Further, the network node 800 may be provided with a module 820 configured to assign resources to the resource contingent and identify excess resources, such as explained in connection with step 720. Further, the network node 800 may be provided with a module 830 configured to receive data packets, such as explained in connection with step 730. Further, the network node 800 may be provided with a module 840 configured to control forwarding of data packets, such as explained in connection with step 740 and the method of FIG. 6.

It is noted that the network node 800 may include further modules for implementing other functionalities, such as known functionalities of switch or gateway for a data network. Further, it is noted that the modules of the network node 800 do not necessarily represent a hardware structure of the network node 800, but may also correspond to functional elements, e.g., implemented by hardware, software, or a combination thereof.

Figure 9:
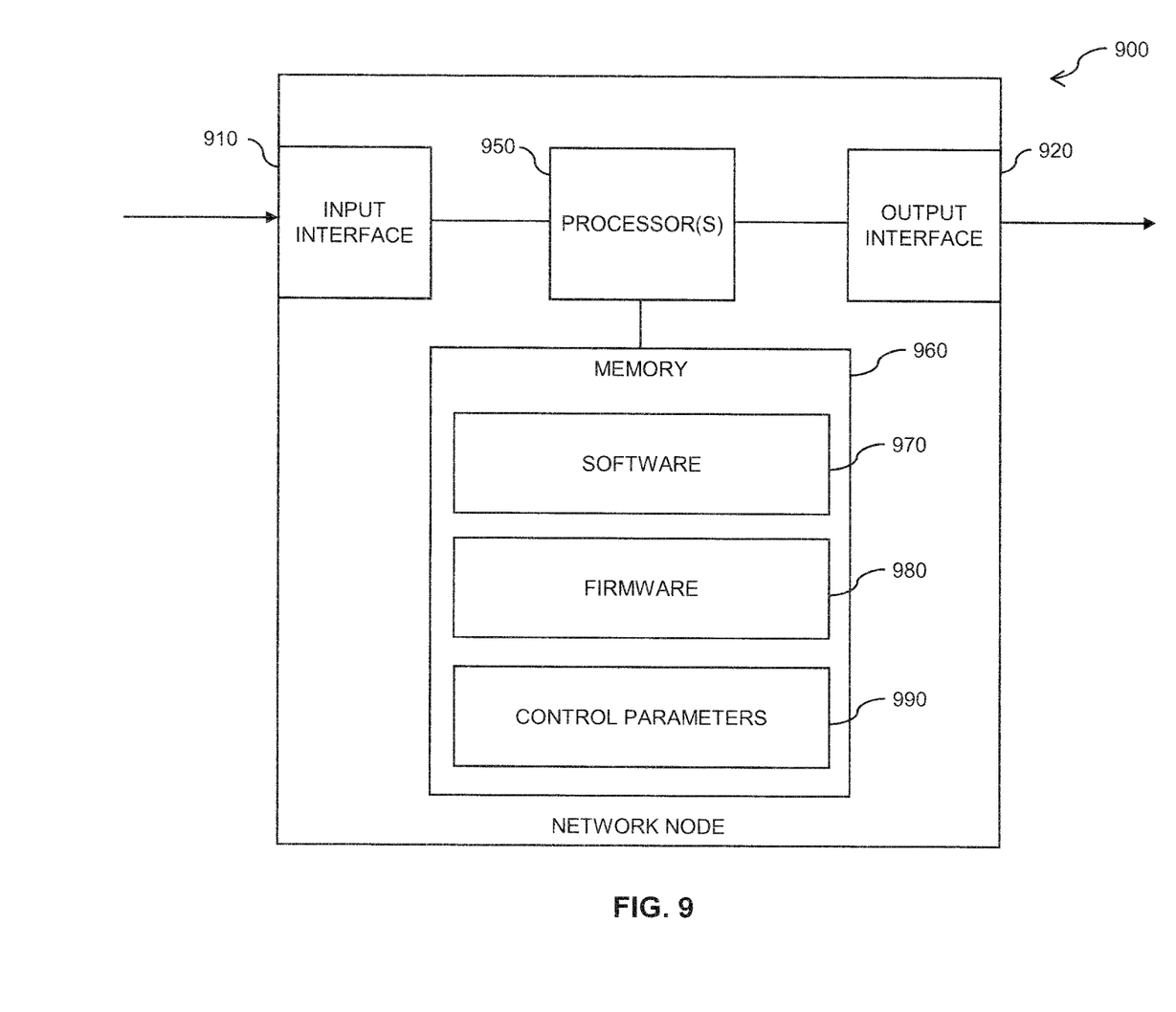
FIG. 9 schematically illustrates structures of a network node according to an embodiment of the invention.

FIG. 9 illustrates a processor-based implementation of a network node 900 which may be used for implementing the above described concepts. The network node 900 may for example correspond to a switch or gateway of the data network.

As illustrated, the network node 900 includes an input interface 910 and an output interface 920. The input interface 910 may be used for receiving data packets, e.g., from other nodes of the data network, such as the above-mentioned traffic sources 110. The output interface 920 may be used for forwarding the data packets, e.g., to other nodes of the data network, such as the above-mentioned traffic destinations 130.

Further, the network node 900 may include one or more processors 950 coupled to the interfaces 910, 920 and a memory 960 coupled to the processor(s) 950. By way of example, the interfaces 910, 920, the processor(s) 950, and the memory 960 could be coupled by one or more internal bus systems of the network node 900. The memory 960 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 960 may include software 970, firmware 980, and/or control parameters 990. The memory 960 may include suitably configured program code to be executed by the processor(s) 950 so as to implement the above-described functionalities of a network node, such as explained in connection with FIGS. 6 and 7.

It is to be understood that the structures as illustrated in FIG. 9 are merely schematic and that the network node 900 may actually include further components which, for the sake of clarity, have not been illustrated, e.g., further interfaces or processors. Also, it is to be understood that the memory 960 may include further program code for implementing known functionalities of a network node, e.g., known functionalities of a switch or gateway.

According to some embodiments, also a computer program may be provided for implementing functionalities of the network node 900, e.g., in the form of a physical medium storing the program code and/or other data to be stored in the memory 960 or by making the program code available for download or by streaming.

As can be seen, the concepts as described above may be used for efficiently utilizing resources which are reserved for providing a guarantee for certain data packets of forwarded data traffic. In particular, the reserved resources may be used for guaranteeing that certain data packets are not dropped and not delayed in excess of a certain delay limit. Other data packets may be dropped or forwarded if sufficient excess resources are available. In this way, the other data packets may benefit from the same delay limit.

It is to be understood that the examples and embodiments as explained above are merely illustrative and susceptible to various modifications. For example, the illustrated concepts may be applied in connection with various kinds of data networks, without limitation to the above-mentioned example of a transport network part of a wireless communication network.

Further, the illustrated concepts may be applied in various kinds of nodes, including without limitation to the above-mentioned examples of a switch or gateway. Moreover, it is to be understood that the above concepts may be implemented by using correspondingly designed software to be executed by one or more processors of an existing device, or by using dedicated device hardware. Further, it should be noted that the illustrated nodes or devices may each be implemented as a single device or as a system of multiple interacting devices.

The invention claimed is:

1. A method of handling data traffic in a data network, the method implemented at a node of the data network and comprising:
   receiving data packets;
   for at least one of the received data packets, determining whether the data packet is a guaranteed data packet which is subject to a guarantee that the data packet is not dropped and not delayed by more than a certain delay limit or a non-guaranteed data packet which is not subject to the guarantee;
   configuring, based on a worst case calculation of a delay experienced by a data packet forwarded by the node, a resource contingent with a maximum amount of resources which is more than a minimum amount of resources required to meet the guarantee;
   assigning resources to the resource contingent and identifying resources in excess of the minimum amount as excess resources;
   in response to determining that the data packet is a non-guaranteed data packet and determining that sufficient excess resources are present, forwarding the non-guaranteed data packet based on the excess resources, and otherwise, dropping the non-guaranteed data packet.

2. The method of claim 1, further comprising in response to determining that the data packet is a guaranteed data packet, forwarding the data packet based on the resources from the resource contingent.

3. The method of claim 1:
   wherein the resource contingent is managed based on a token bucket; and
   wherein the resources are assigned to the resource contingent by adding tokens to the token bucket.

4. The method of claim 3, wherein a size of the token bucket corresponds to the maximum amount of resources of the resource contingent.

5. The method of claim 3 further comprising:
   configuring the token bucket with a size corresponding to the minimum amount of resources required to meet the guarantee; and
   configuring a further token bucket for the excess resources and adding tokens to the further token bucket only if the token bucket is full.

6. The method of claim 1:
   wherein the received data packets are part of multiple flows;
   wherein, for each of the flows, a corresponding resource contingent is configured with a maximum amount of resources which is more than a minimum amount of resources required to meet the guarantee;
   wherein, for each of the flows, resources are assigned to the corresponding resource contingent and resources in excess of the minimum amount are identified as excess resources; and
   in response to determining that the data packet is a non-guaranteed data packet and determining that sufficient excess resources are present, forwarding the data packet based on the excess resources.

7. The method of claim 6, further comprising, in response to determining that the data packet is a guaranteed data packet, forwarding the data packet based on based on the resources in the resource contingent corresponding to the flow the data packet is part of.

8. The method of claim 6:
wherein, for each of the flows, the corresponding resource contingent is managed based on a corresponding token bucket; and
wherein, for each of the flows, resources are assigned to the corresponding resource contingent by adding tokens to the corresponding token bucket.

9. The method of claim 8, wherein, for each of the flows, a size of the corresponding token bucket corresponds to the maximum amount of resources of the corresponding resource contingent.

10. The method of claim 8, further comprising:
for each of the flows, configuring the corresponding token bucket with a size corresponding to the minimum amount of resources required to meet the guarantee; and
configuring a further token bucket for the excess resources and adding tokens to the further token bucket only if one of the corresponding token buckets of the resource contingents for the flows is full.

11. The method of claim 1:
wherein each of the received data packets is marked with a value; and
wherein whether the data packet is a guaranteed data packet or a non-guaranteed data packet is determined depending on the value.

12. The method of claim 11, further comprising determining whether the data packet is a guaranteed data packet or a non-guaranteed data packet by comparing the value to a threshold.

13. The method of claim 11, further comprising, in response to determining that the data packet is a non-guaranteed data packet, deciding whether to drop the data packet depending on the value.

14. The method of claim 11, further comprising deciding whether the data packet is a guaranteed data packet or a non-guaranteed data packet depending on the value and a size of the data packet.

15. The method of claim 11, further comprising determining whether the sufficient excess resources are present depending on the value and a size of the data packet.

16. The method of claim 1, further comprising:
maintaining a queue for temporarily storing the received data packets; and
in response to determining that at least one of the received data packets is a non-guaranteed data packet, deciding between the storing the non-guaranteed data packet in the input queue and dropping the non-guaranteed data packet.

17. A node for a data network, the node comprising:
processing circuitry;
memory containing instructions executable by the processing circuitry whereby the node is operative to:
receive data packets;
for at least one of the received data packets, determine whether the data packet is a guaranteed data packet which is subject to a guarantee that the data packet is not dropped and not delayed by more than a certain delay limit or a non-guaranteed data packet which is not subject to the guarantee;
configure, based on a worst case calculation of a delay experienced by a data packet forwarded by the node, a resource contingent with a maximum amount of resources which is more than a minimum amount of resources required to meet the guarantee;
assign resources to the resource contingent and identify resources in excess of the minimum amount as excess resources;
in response to determining that the data packet is a non-guaranteed data packet and determining that sufficient excess resources are present, forward the non-guaranteed data packet based on the excess resources, and otherwise dropping the non-guaranteed data packet.

18. The node of claim 17, wherein the instructions are such that the node is operative to, in response to determining that the data packet is a guaranteed data packet, forward the data packet based on the resources from the resource contingent.

19. The node of claim 17:
wherein the received data packets are part of multiple flows;
wherein the instructions are such that the node is operative to:
for each of the flows, configure a corresponding resource contingent with a maximum amount of resources which is more than a minimum amount of resources required to meet the guarantee;
for each of the flows, assign resources to the corresponding resource contingent and identify resources in excess of the minimum amount as excess resources; and
in response to determining that the data packet is a non-guaranteed data packet and determining that sufficient excess resources are present, forward the data packet based on the excess resources.

20. A non-transitory computer readable recording medium storing a computer program product for handling data traffic in a data network, the computer program product comprising software instructions which, when run on processing circuitry of a node of the data network, causes the node to:
receive data packets;
for at least one of the received data packets, determine whether the data packet is a guaranteed data packet which is subject to a guarantee that the data packet is not dropped and not delayed by more than a certain delay limit or a non-guaranteed data packet which is not subject to the guarantee;
configure, based on a worst case calculation of a delay experienced by a data packet forwarded by the node, a resource contingent with a maximum amount of resources which is more than a minimum amount of resources required to meet the guarantee;
assign resources to the resource contingent and identify resources in excess of the minimum amount as excess resources;
in response to determining that the data packet is a non-guaranteed data packet and determining that sufficient excess resources are present, forward the non-guaranteed data packet based on the excess resources, and otherwise dropping the non-guaranteed data packet.

* * * * *